United States Patent [19]

Boily

[11] Patent Number: 5,090,195

[45] Date of Patent: Feb. 25, 1992

[54] PROPULSION MOTOR USING FINE PARTICULATE MATERIAL

[76] Inventor: Jocelyn Boily, 1841 Greensacre Crescent, Gloucester, Ontairo, Canada, K1j 6S7

[21] Appl. No.: 602,584

[22] Filed: Oct. 23, 1990

Related U.S. Application Data

[63] Continuation-in-part of Ser. No. 232,675, Aug. 16, 1988, abandoned.

[30] Foreign Application Priority Data

Aug. 15, 1989 [CA] Canada .................................. 608380

[51] Int. Cl.⁵ ................................................. F02B 75/00
[52] U.S. Cl. ........................................... 60/204; 60/203.1
[58] Field of Search .................... 60/200.1, 203.1, 251, 60/266, 267, 204

[56] References Cited

U.S. PATENT DOCUMENTS

| | | | |
|---|---|---|---|
| 3,064,418 | 11/1962 | Sanders | 60/203.1 |
| 3,097,480 | 7/1963 | Sohn | 60/204 |
| 3,102,384 | 9/1963 | Bennett . | |
| 3,303,651 | 2/1967 | Grant, Jr. et al. . | |
| 3,380,249 | 4/1968 | Meckel . | |
| 3,427,808 | 9/1969 | Butcher | 60/204 |
| 3,469,401 | 9/1969 | Hassel | 60/204 |
| 3,807,169 | 4/1974 | Bradford | 60/261 |
| 4,038,557 | 4/1977 | Gildeisleeve, Jr. et al. . | |
| 4,585,191 | 4/1986 | Blount | 60/203.1 |

*Primary Examiner*—Richard A. Bertsch
*Assistant Examiner*—Timothy S. Thorpe
*Attorney, Agent, or Firm*—McFadden, Fincham, Marcus & Anissimoff

[57] ABSTRACT

A propulsion motor using a fine particulate material, having a heat content, the material being fed to a convergent portion upstream of and adjacent to the throat of a propulsion nozzle. A fluid under pressure is also fed to the convergent portion, to mix with the particulate material. The fluid is heated by the particulate material, increasing volume and speed, the particulate material and the fluid ejecting from the nozzle. A particular use of such a motor would be on the moon, or some other body, where a fine particulate material can be made available locally.

5 Claims, 2 Drawing Sheets

PROPULSION MOTOR USING FINE PARTICULATE MATERIAL

FIELD OF THE INVENTION

This invention relates to propulsion motors, such as rocket and similar thrust motors, and in particular relates to such motors using a fine particulate material as a major part of the thrust producer.

BACKGROUND OF THE INVENTION

Various forms of rocket and similar propulsion motors exist, the primary ones comprising solid fuel and liquid fuel motors which use a chemical reaction between two or more materials to produce a jet of matter for propulsion. The present motors are complex, expensive, and dangerous. The cost of putting a payload into low earth orbit is somewhere between $3000 and $6000 per Kg. In addition to the high cost, the availability of launches is restricted.

The number of man-hours in space continues to increase and consequently the amount of payload in orbit increases. The number of payloads per year increases and also the weight per payload. The capability of launches is increasing but demand rises faster.

It has been proposed to build a propellant plant on the moon to extend the capacity of launcher and possibly reduce costs of space usage. It takes approximately one-tenth of the energy to bring material from the moon to low earth orbit in comparison to the energy required from the surface of the earth. Producing such propellant on the moon could be expensive.

SUMMARY OF THE INVENTION

In accordance with the present invention, propulsion is obtained by using fine particulate material produced from the regolith on the moon or other launch position using a minimal amount of processing. The particulate material is given energy content in the form of heat and is ejected through a nozzle by a flow of pressurized fluid. The particulate material heats up the fluid, causing the fluid to expand in volume, and speed, causing ejection of the particulate material and producing thrust.

Broadly, in accordance with the invention, there is disclosed a propulsion motor using heated fine particulate material, comprising; a propulsion nozzle having a throat; a convergent portion upstream of and adjacent to the throat; a container for the heated fine particulate material; a tank for holding a fluid; means for feeding the heated fine particulate material and the fluid to the convergent portion to mix the fluid and the particulate material and heating the fluid by the particulate material for issue through the throat and from the nozzle.

The invention also includes a method of propulsion comprising; feeding a heated fine particulate material from a container of the heated fine particulate material to a convergent portion upstream of and adjacent to the throat of a propulsion nozzle; feeding a fluid under pressure from a tank of the fluid to the convergent portion; mixing the heated fine particulate material and the fluid and increasing the temperature and volume of the fluid by heat exchange between the particulate material and the fluid, and ejecting the particulate material and the fluid at an increased speed from the nozzle.

The invention will be readily understood by the following description of certain embodiments, by way of example, in conjunction with the accompanying diagrammatic drawings, in which:

DETAILED DESCRIPTION OF THE PREFERRED EMBODIMENTS

Figure 1:
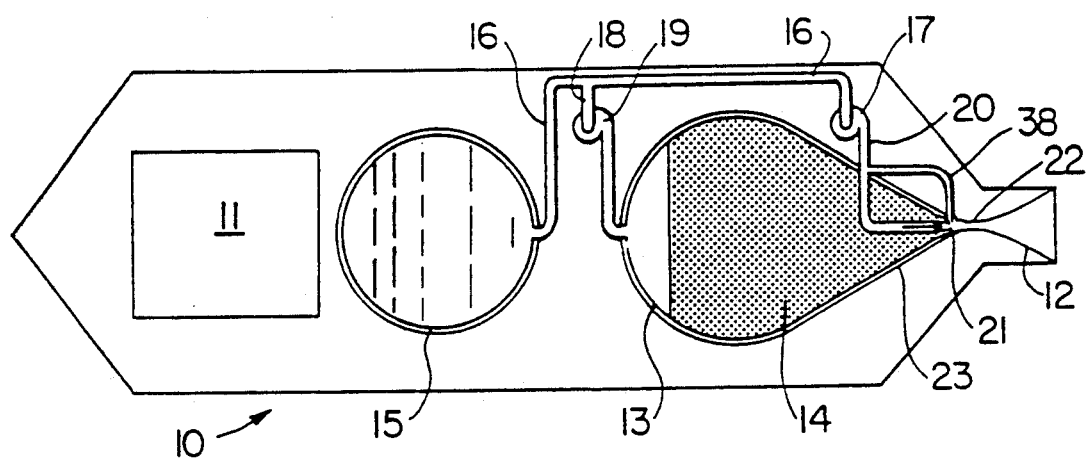
FIG. 1 is a cross-section through one form of motor in a vehicle.

As illustrated in FIG. 1, a vehicle is indicated generally at 10. A payload is shown at 11, and a propulsion nozzle at 12. A container or vessel 13 contains fine particulate material 14 and a tank 15 holds a fluid, for example, liquid hydrogen. Fluid is fed from the tank 15 via a pipe 16 to a high pressure pump 17. A branch 18 feeds fluid from the pipe 16 to a low pressure pump 19.

The outlet from the high pressure pump 17 is fed via pipe 20 to an outlet 21, adjacent to the throat 22, the speed of the fluid at the exit of the outlet 21 injecting and pressurizing the material 14 into the convergent part of the nozzle. The fluid from the low pressure pump is fed to the rear of the container 13 to pressurize the particulate material towards the nozzle. Conveniently the container 13 and propulsion nozzle 12 are a unitary member but not necessarily so. The container can have a light insulating wall 23.

Figure 2:
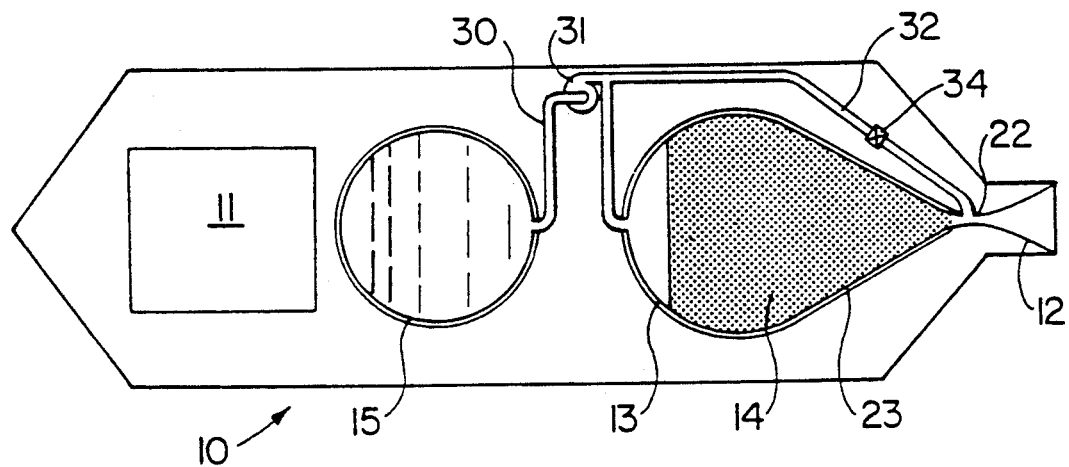
FIG. 2 is a cross-section similar to that of FIG. 1, of another form of motor in a vehicle.

In FIG. 2, the two pumps 17 and 19 of FIG. 1 are replaced by a single high pressure pump. Items common with FIG. 1 are given the same reference numerals. In FIG. 2, the fluid is fed from the tank 15 via pipe 30 to a high pressure pump 31. From the pump 31 fluid is fed via pipe 32 to a position adjacent to the throat 22 of the nozzle and also to the rear of the container 13 by pipe 33. A servo-valve 34 can be provided in the pipe 32 to control the flow. In the example, the container or vessel 13 is a high pressure construction and may have an insulating wall 23. The particulate material 14 is given a heat content. This can be obtained in various ways. It can be heated in a storage system, for example, by solar heating. A heat source can be provided in the vehicle, or heat, such as solar heat and can be applied to the material as it is used. Other ways of providing heat can be provided. It is also possible to use material that has a heat content at its source, using its actual temperature, a martian moon for example.

Figure 3:
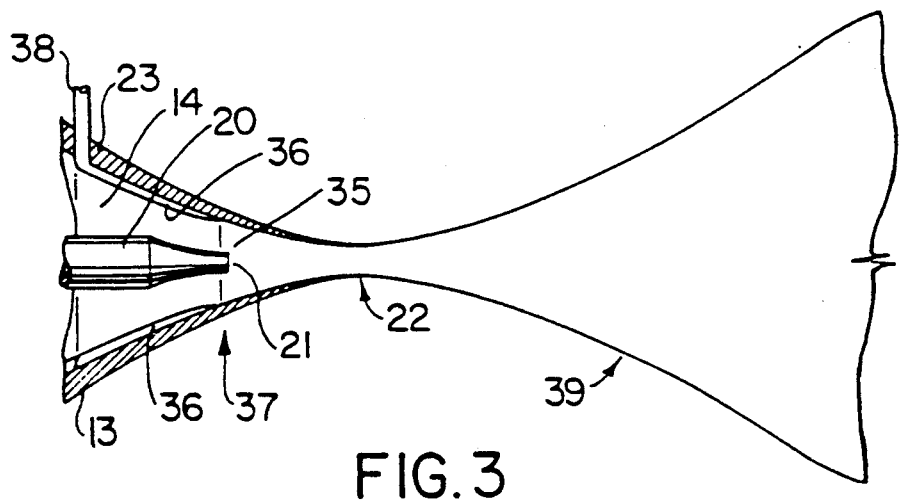
FIG. 3 is an enlarged cross-section of the nozzle position as in FIG. 1.
Figure 4:
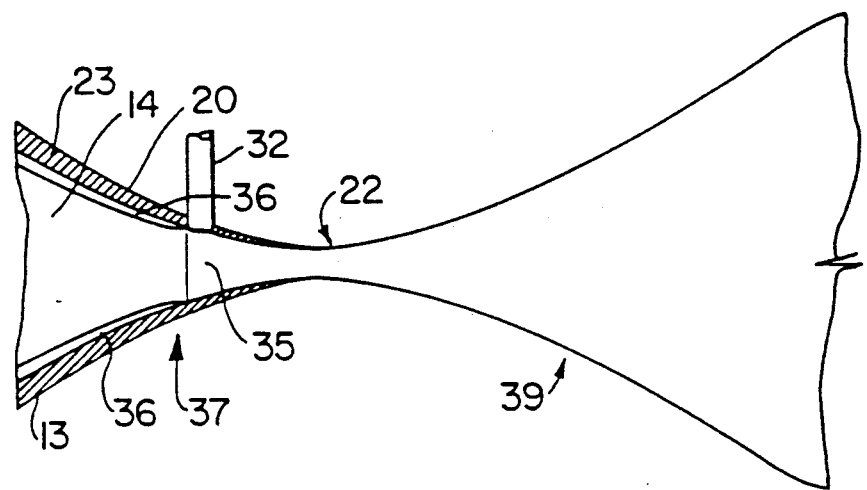
FIG. 4 is an enlarged cross-section of the nozzle position as in FIG. 2.

FIGS. 3 and 4 illustrate, to a larger scale, the throat regions of the nozzles, in the arrangements of FIGS. 1 and 2, respectively. In FIG. 3 and FIG. 4, a mixing area or chamber 35 is provided immediately upstream of the throat 22. This provides for initial mixing of the particulate material and the pressurized fluid, raises the temperature and increases the speed of the fluid and the particulate material in the nozzle. Preferably a fluidizing lining 36 is provided in the wall of the convergent portion 37, to ensure that the particulate material will flow into the mixing chamber 35. In FIG. 3, a separate fluid supply 38 can be provided, also illustrated in FIG. 1 and in FIG. 4, fluid can feed into the fluidizing lining from the pipe 32. Mixing and heating continues beyond the throat 22 into the divergent portion 39.

The insulating material used for the wall 23 can be the same material as the propulsion particulate material 14. The wall is hollow and filled with the particulate material and then can afterwards be used. It can become part of the payload for example, or could be used as the propulsion particulate material for a return flight, if it contained sufficient heat content, or is heated.

The material 14 is intended to be a fine particulate material produced at the launch site, for example the moon, from local material as by mechanical separation of fine particulate material from the regolith, crushing, milling or other processes. The material car be stored and heated by solar heat, for example, by a concentrating mirror. The payload 11 could also be material produced at the launch site and could be the same as material 14. It could be used for the manufacture of articles in space, for example, solar cells for a solar power satellite system. The material is readily heated to around 1000° C. by solar heat.

The fluid in tank 15 is generally a liquified gas, and hydrogen is particularly effective. Oxygen and carbon dioxide are also usable. Other fluids can be used. The molecular weight of the fluid used affects the exit speed at the nozzle. Hydrogen has the best attainable speed, oxygen has a lower attainable speed and carbon dioxide has an even lower attainable speed, at nozzle exit.

In the examples illustrated in FIGS. 1 and 2, 1.2 tonnes of hydrogen, with 110 tonnes of particulate material would enable 25 tonnes of payload 11 with an empty ship weight of 5 tonnes, to be put into moon orbit. Subsequent propulsion using the same propulsion system on a low thrust or other system can then be used to bring the payload to a low earth orbit. The following data relates to these arrangements-flow at high pressure pump, 17 or 31, 2.0 Kg/sec; fine particulate material flow 200 Kg/sec; temperature of particulate material 1000° C.; total thrust 284000N; and a specific thrust of 1400 N/Kg. The container 13 and nozzle 12, with tank 15 and associated pipes and pumps, would form a reusable module and about 13 tonnes of material 14, and the related amount of fluid, would be required for landing back on the moon.

As stated previously, the heat content of the particulate material can be obtained in various ways. It can be heated in storage and then transferred to the container 13. It can have an inherent heat content depending upon its source. For example, on a Martian moon, the material would be at a temperature of around 250° C. This would be sufficient to produce an exhaust speed of around 300 to 400 meters/second without addition of heat and would be sufficient for intermoon travel.

Figure 5:
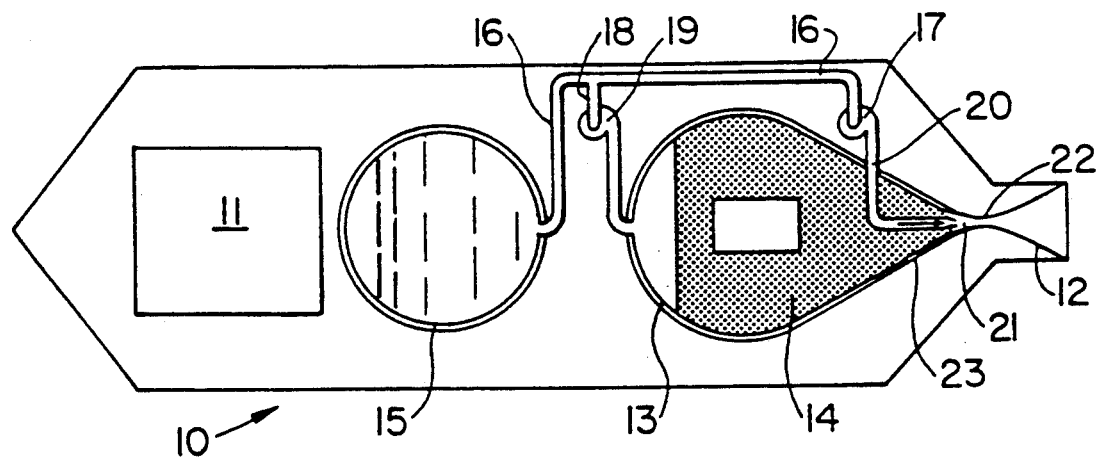
FIG. 5 illustrates a modification of the arrangement of FIG. 1.

A further heating arrangement is by an on-board heater. One example is illustrated in FIG. 5, a modification of FIG. 1, with common references used. In FIG. 4, a heat source 40, for example, a nuclear heat source in conjunction with a heat exchanger, can be used. The heat exchanger can be positioned at the mixing chamber. The nuclear heat source can heat the particulate material, and/or the fluid. The heat exchanger could be positioned at or adjacent to the mixing area or chamber. A further alternative is to provide some form of solar heat collector around the vehicle and feed the heat to the material 14, perhaps adjacent to the mixing chamber 35.

It is also possible for heat to be conducted into the fluid container to produce the pressure necessary. However, this would require some heavier construction.

Other ways of injecting the particulate material and fluid into the mixing chamber can also be used.

Although specific embodiments of the present invention have been described above, it is not limited thereto and it will be apparent to those skilled in the art that numerous modifications form part of the present invention insofar as they do not depart from the spirit, nature and scope for the claimed and described invention.

I claim:

1. A method of propulsion comprising:
   feeding a heated fine particulate material from a container of said heated fine particulate material to a convergent portion upstream of and adjacent to the throat of a propulsion nozzle;
   feeding a fluid under pressure from a tank of said fluid to said convergent portion;
   mixing said heated fine particulate material and said fluid and increasing the temperature and volume of said fluid by heat exchange between said particulate material and said fluid; and
   ejecting said particulate material and said fluid at an increased speed from said nozzle.

2. The method of claim 1, said fluid being hydrogen.

3. The method of claim 1, including feeding said fluid coaxial with and inside of said convergent portion.

4. The method of claim 1, including feeding said fluid to the wall of said convergent portion.

5. The method of claim 1, including fluidizing said particulate material at the wall at the convergent portion.

* * * * *